Aug. 17, 1965    W. M. TURLINGTON    3,201,139
MERCHANDISE CART HAVING GROUND ENGAGEABLE ANTI-THEFT MEANS
Filed Aug. 12, 1963
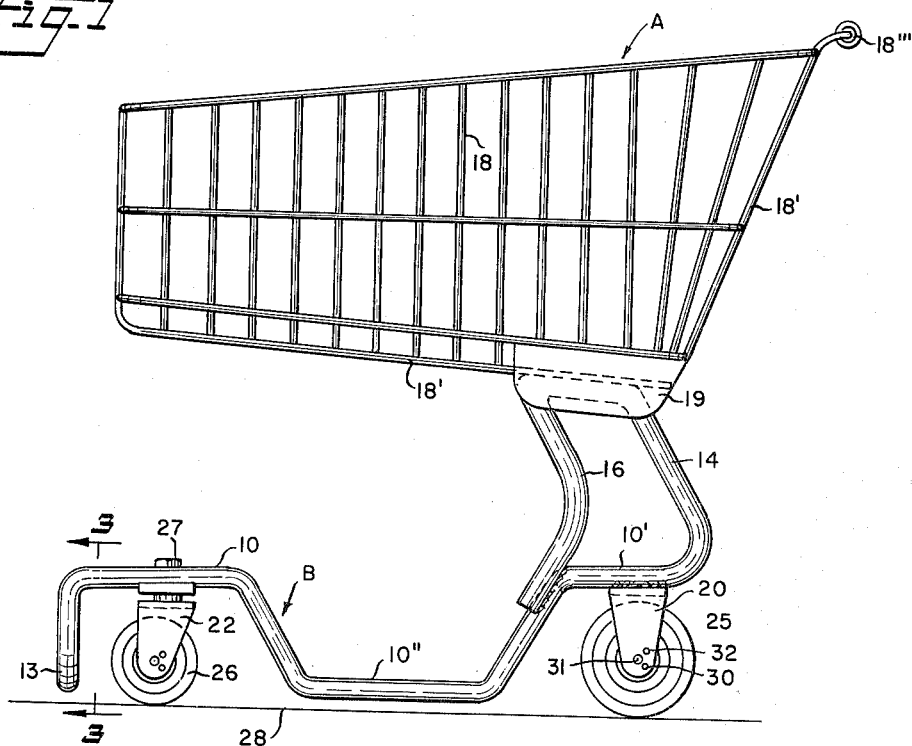
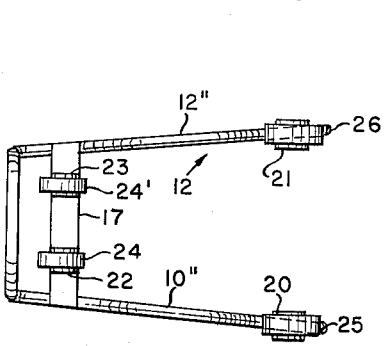
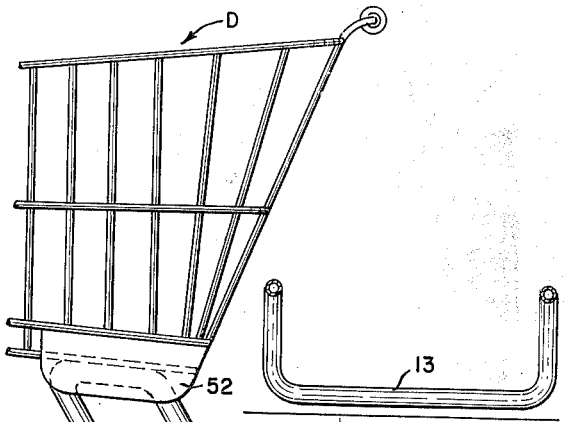
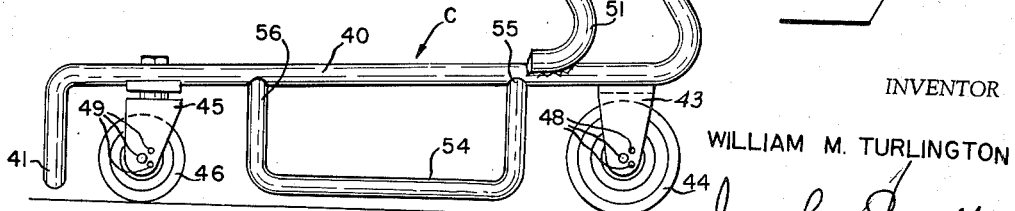
INVENTOR
WILLIAM M. TURLINGTON
ATTORNEY

United States Patent Office 3,201,139
Patented Aug. 17, 1965

3,201,139
MERCHANDISE CART HAVING GROUND
ENGAGEABLE ANTI-THEFT MEANS
William M. Turlington, 5612 Midwood Ave.,
Baltimore, Md.
Filed Aug. 12, 1963, Ser. No. 301,295
2 Claims. (Cl. 280—33.99)

The present invention relates to a cart for customers to transport merchandise about the premises of shopping centers, supermarkets, etc.

These carts are generally provided with means for rotatably supporting at least two spaced rear wheels and two caster front wheels for supporting the cart on a supporting surface, such as, the floor of the establishment, and other surrounding substantially smooth surfaces.

At the present time there is a high degree of loss in these carts. It is common to see these carts abandoned many blocks from the place of business, and it is often the practice of children to use these carts as scooters, coaster wagons and other riding vehicles.

These carts are constructed so that they may be nested in order that they may be collected on a minimum amount of floor space and will be referred to more in detail later in respect to the present construction of the cart.

The primary object of the invention is to provide a cart, wherein its structure is such, as to discourage its use outside the shopping center, or market place by providing surface engaging means for engaging upwardly extended portions of slightly uneven surface, making it difficult to operate the cart over pavements, curbs, streets and the like having these slightly uneven surfaces.

Another object of the invention is to provide a surface contacting means by forming the frame in a specific manner, or by modifying the structure of the presently designed cart to prevent its misuse and at the same time construct a cart that is practical in its operation without changing drastically the design of the present cart, or to interfere with the nesting thereof.

While several objects of the invention have been set forth, other objects and advantages will be more apparent as the nature of the invention is more fully disclosed, the same consisting of its novel construction, combination and arrangement of its several parts shown in the accompanying single sheet of drawings forming a part of the specifications to follow, in which:

FIGURE 1 is a view in side elevation of a merchandising cart showing the invention.

FIGURE 2 is an enlarged fragmentary side elevational view of a modified form of the cart.

FIGURE 3 is a section view taken along line 3—3 of FIGURE 1.

FIGURE 4 is an inverted plan view of the cart.

In describing the invention like reference characters are used to point out like and similar parts throughout the several views.

A cart of this type generally consists of a basket supported on a frame having a handle either attached to the frame or basket for operating the cart. The design of the cart is such as to allow the carts to be nested one behind, or in front of the other, including wheels for supporting the cart and for moving the same over a supporting surface. In order to nest the carts the back of the basket is hinged at its upper end, or top and is movable inwardly and upwardly when the front end of the basket behind is inserted into the back of the forward basket. The frame preferably has no lateral support in the vicinity of the rear portion of the frame. (See FIGURE 4.) However, if the lower portion of the frame is provided with a shelf as they usually are, as shown in dotted lines resting on the raised portion of the frame in FIGURES 1 and 3 in Design Patent No. 184,169 dated December 30, 1958, the frame or the tray may be sloped either upwardly or downwardly toward the front end of the cart in order to eliminate interference of the trays with each other in stacking the carts. The frame portion is also tapered slightly inwardly in the direction of the front end of the cart which also gives sufficient clearance between the side frame portions for nesting the carts.

Referring now in particular to FIGURES 1 and 3 of the drawings the cart A is provided preferably with a rugged tubular frame B comprising two side portions 10 and 12 and a front portion 13 connecting the two side portions to provide a continuous rigid frame section. However, these cart frames are made in many styles and are sometimes constructed of a plurality of small solid rods. Referring now again to the present construction, the present frame is formed from tubing with a raised portion 10 and 10', a lowered portion 10" forward of the means for supporting the rear wheels, and a turned down portion 13 adjacent its front forward of the front wheels. The frame is formed to extend upwardly adjacent the rear thereof as shown by members 14 and 16. The portions 14 and 16 of the frame may be a continuation of the raised portion 10', or they may be separate members attached to the lower frame member by some connection method such as by welding, bolting, etc. The upper ends of the members 14 and 16 are connected to a plate 19 which in turn is connected to the bottom portion 18' of a metal basket 18. While only one side view of the cart is shown in FIGURE 1, the opposite side 12 is of identical form and it is not believed necessary to give a duplicate detail description of side 12 when all the elements are shown and described in side 10. The rear end 18" of the basket 18 is provided with a hinged back (not shown) adjacent the top thereof and movable inwardly and upwardly when a second basket is inserted in the process of nesting the carts. The object of the basket construction of these carts is to not have a fixed lateral support between the sides at the rear of the basket. The bottom of the basket is slightly inclined upwardly in the direction of the front. In order to nest the carts, it is also necessary to have the sides of the basket tapered slightly inwardly toward the front, in order that one basket may virtually fit within another basket when inserted from the back.

The cart is provided with a handle 18''' for manipulating the same.

Referring to the construction of the frame each side as illustrated in FIGURE 1 is provided with a raised portion 10 adjacent its front, and a raised portion 10' adjacent the rear. On the raised portions 10 and 10' and similar raised portions of the side portion 12, there are provided brackets as shown at 20, 21, 22 and 23, beneath the frame for supporting the cart. (See FIGURE 4.) The rear brackets 20 and 21 are fixed to the under side of the frame by welding etc. The front brackets 22 and 23 are mounted on a cross piece 17 and are adapted to rotate in a horizontal plane and may be referred to hereinafter as casters. Rotatably supported in rear brackets 20 and 21 are wheels 25 and 26 and supported in the front caster brackets 22 and 23 are wheels 24 and 24'. These caster brackets are rotatably held to the member 17 by the bolts 27. The front portion 13 of the frame, and the portion connecting the side portions 10 and 12 extends downwardly between the side frame members 10 and 12 to a point adjacent the supporting surface 28 upon which the cart is supported. The central lower portion of the frame extends downwardly to a point adjacent the supporting surface 28 as shown at 10" and is preferably a continuation of the tubular frame portion making up the raised portions.

The front portion 13 of the frame and the portion 10" and a corresponding portion 12" are positioned slightly above the supporting surface and are so positioned as to engage any irregularities extending upwardly from a substantially level surface, such as would be encountered in the average streets, road, etc., in order to make the cart an impractical vehicle when operated over these uneven surfaces.

It has been found that the height of these portions 13, 10″ and 12″ (only shown in FIGURE 4) from the supported surface is most satisfactory at approximately $3/16$ of an inch for the average shopping center floor. However, all the brackets are provided with holes as illustrated at 30, 31 and 32 in bracket 20 for adjusting the heighth of the frame above the supporting surface at $3/16$ of an inch steps, in order to take care of greater unevenness in the supporting surface over which the cart is being operated. In this particular cart design, it will be noted that the parts of the frame carrying the brackets are raised and the part of the frame between the brackets along each side extends downwardly to form a surface engaging element along with portion 13 at the front of the frame which also projects downwardly to form another surface engaging element. This particular design has the advantage that it does not lend itself readily to alterations, whereby these surface engaging portions of the frame could be easily eliminated.

The modified form of the invention is shown best in FIGURE 2. In this form the cart is provided with a frame C having a substantially horizontal portion 40, and a turned down portion 41, similar to the portion 13 as shown and described for FIGURE 1. The inverted plan view of FIGURE 2 (not shown) is substantially the same as that shown in FIGURE 4. The frame has fixed adjacent its rear a pair of brackets illustrated by the numeral 43 in which are mounted wheels, such as shown at 44. On the front of the cart and positioned beneath the frame there are mounted caster brackets, such as shown at 45, in which supporting wheels 46 are mounted. All the wheels are adjustable for height within their respective supporting brackets to regulate the height of the frame from the supporting surface as illustrated by holes 48 and 49 for raising the cart by $3/16$ of an inch steps. The cart is provided with upwardly extended members 50 and 51 which are secured to a plate 52, which in turn is secured to the basket D, which is identical with basket A.

Preferably welded to the horizontal portion 40 of the frame C is a downwardly extended member 54. This member extends from a point 55 adjacent the rear brackets to a point 56 adjacent the front brackets and extends along and beneath both sides of the frame as illustrated in FIGURE 2. It will be noted the downwardly formed portion 41 is positioned substantially the same distance from the supporting surface 28 as the downwardly extended member 54.

This arrangement has substantially the same effect upon the movement of the cart as the portion 10″ and the portion 13 as shown and described for FIGURE 1.

These surface engaging elements such as 10″ and 13, as shown in FIGURES 1 and 3, and 54 and 41 as shown in FIGURE 2 are preferably positioned in a vertical plane with the raised side portions 10, 10′ in FIGURE 1 and 40 in FIGURE 2 of the frame, so that they will not interfere with the nesting of the carts.

As stated hereinbefore, the surface contacting portion of the frame, which travels only a short distance from the supporting surface, restricts the use of the cart except on reasonably smooth surfaces and will therefore discourage misuse for the purposes previously referred to.

While the invention is shown in only two forms it is not intended as a limitation to the claims of the invention as various detailed changes may be made by those skilled in the art without departing from the general principles involved and therefore the scope of the invention is best defined in the appended claims.

I claim:
1. A cart for transporting merchandise comprising in combination:
   (a) a rigid frame having two tubular lower side portions extending throughout the length of the cart including a front end and a rear end, the two lower side portions of the frame having their portions adjacent the front and the rear ends in a substantially horizontal plane and an intermediate portion lying between the said front and rear ends and connected thereto, the intermediate portion having a section running in a horizontal plane below and parallel with the horizontal plane extending through the front and rear end portions of the tubular frame;
   (b) the two lower tubular side portions of the frame having portions extending upwardly from the rear ends thereof for a predetermined distance;
   (c) a basket supported on the upwardly extended side portions, said basket extending over and above the lower horizontal portions of the frame;
   (d) a fixed wheel supporting means permanently and rigidly fixed to the rear end of each of the horizontal lower tubular side portions for receiving and supporting a rotatable wheel and a combination caster and wheel support adjacent the front end of the horizontal frame, said wheels adapted to movably support the cart upon a supporting surface, the wheels supporting the cart in a position whereby the lower intermediate portion of the frame is in close proximity to the supporting surface for the cart, for engaging irregularities in the supporting surface beyond a predetermined height as the cart is moved over the supporting surface.

2. In a cart for transporting merchandise as claimed in claim 1 wherein, the intermediate portions are of U shape extended downwardly and between the front and rear ends of the frame, the closed ends of the U shaped portions being within close proximity to the supporting surface when the cart is supported thereon by the wheels.

References Cited by the Examiner

UNITED STATES PATENTS

| D. 184,169 | 12/58 | Davis et al. | |
|---|---|---|---|
| D. 190,279 | 5/61 | Hummer. | |
| 2,823,042 | 2/58 | Gelbond | 280—33.99 |

A. HARRY LEVY, *Primary Examiner.*